June 18, 1957 C. N. BOODE 2,796,567
RESISTOR CALIBRATING SERVOSYSTEM
Filed Oct. 24, 1955
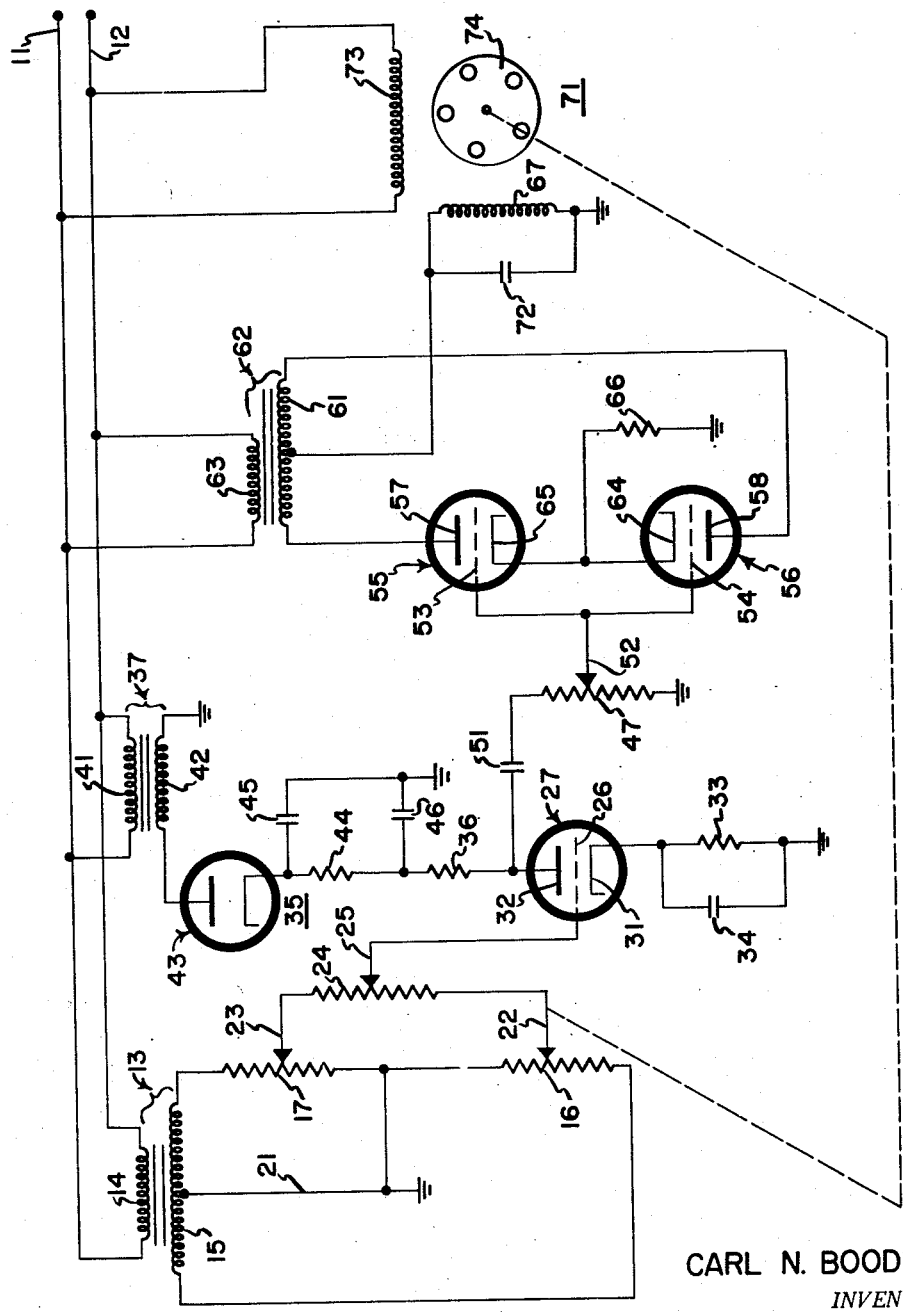
CARL N. BOODE
*INVENTOR.*
BY *Edd D. O'Brien*
*Atty*

# United States Patent Office 2,796,567
Patented June 18, 1957

2,796,567

RESISTOR CALIBRATING SERVOSYSTEM

Carl N. Boode, Riverside, Calif., assignor to Bourns Laboratories, Inc.

Application October 24, 1955, Serial No. 542,135

2 Claims. (Cl. 318—29)

This invention relates to means for calibrating potentiometers, and more particularly, to means for automatically and quickly calibrating precision potentiometers.

A precision potentiometer may include a linear resistive element wound so that rotation of a wiper by a given amount always inserts a specified amount of resistance in the associated circuit. Therefore, it is frequently necessary to precisely determine the resistance inserted in the circuit by the wiper at various known angular positions. Heretofore, such calibrations have been slow and costly, requiring an expensive Wheatstone bridge with many precision resistors. In constrast, this invention requires only a single standard precision potentiometer, which is calibrated. An equal alternating current is passed through both potentiometers, opposed 180 degrees in phase. A suitable servo system automatically adjusts the standard potentiometer, thereby indicating the resistance of the potentiometer being tested at the desired setting.

It is, therefore, an object of this invention to provide means for calibrating a potentiometer.

It is another object of this invention to automatically determine the resistance of a potentiometer.

It is another object of this invention to automatically compare the resistance of a potentiometer with a standard potentiometer.

It is another object of this invention to automatically adjust the resistance of a standard potentiometer to equal that of a potentiometer to be calibrated.

It is another object of this invention to measure a resistance by automatically adjusting a calibrated standard potentiometer to provide an equal resistance.

It is another object of this invention to provide a resistance increasing device which is automatic, inexpensive to build and simple to operate.

Other objects and advantages of this invention will become apparent from the following description and appended drawing, wherein a schematic diagram of the circuit of this invention is illustrated.

A suitable source of alternating current, not shown, is connected to conductors 11 and 12. A transformer 13 has primary winding 14 connected to conductors 11 and 12, and a secondary winding 15 connected to potentiometers 16 and 17. Potentiometer 16 is the calibrated standard potentiometer, and potentiometer 17 the potentiometer to be tested. The center tap of secondary winding 15 and the junction of potentiometer 16 and 17 are connected to ground by means of conductor 21. Standard potentiometer 16, which may conveniently be of the multi-turn, helical type, has a wiper 22. Similarly, potentiometer 17, under test, has a wiper 23. Balancing potentiometer 24 is connected between wipers 22 and 23. Wiper 25 of balancing potentiometer 24 is connected to control electrode 26 of electron discharge device 27.

In addition to control electrode 26, discharge device 27 includes a cathode 31 and an anode 32. Cathode 31 is connected to ground through bias resistor 33 and parallel bypass capacitor 34. Anode 32 is connected to a source of D. C. potential 35 through load resistor 36. Included in D. C. power supply 35 is transformer 37 having a primary winding 41 connected to conductors 11 and 12, and secondary winding 42. Secondary winding 42 is connected to diode rectifier 43 and ground. A filter circuit including series resistor 44 and capacitors 45 and 46 provide the D. C. operating potential to discharge device 27.

The output signal from discharge device 27 is applied to potentiometer 47 through blocking capacitor 51. Wiper 52 of potentiometer 47 is connected to control electrodes 53 and 54 of electron discharge devices 55 and 56, respectively. Anodes 57 and 58 of discharge devices 54 and 55 are connected to opposite ends of secondary winding 61 of transformer 62. Primary winding 67 is connected to conductors 11 and 12. Cathodes 64 and 65 of discharge devices 54 and 55 are connected to ground through resistor 66.

The center tap of secondary winding 61 is connected to field winding 67 of a two phase induction motor 71. Connected in parallel with winding 67 is a capacitor 72. Motor 71 is provided with a second field winding 73, connected to conductors 11 and 12. Rotor 74 of motor 71 is connected by a suitable mechanical linkage to adjust the position of wiper 22 of standard potentiometer 16.

In operating this invention, wiper 23 of test potentiometer 17 is adjusted to the position at which the resistance is desired. By way of example, if the potentiometer resistance at 10 degrees of rotation is desired, wiper 23 is so adjusted. An alternating voltage is applied across potentiometers 16 and 17. As will be obvious to one skilled in the art, the voltage across potentiometer 16 is 180 degrees opposed in phase from the voltage across potentiometer 17. The voltage present at wiper 25 of potentiometer 24 is zero when wiper 22 and 23 are at the same position. If wiper 22 is closer to ground than wiper 23, a voltage of one phase will be present at wiper 25, the amplitude thereof varying with the amount of displacement. Conversely, if wiper 22 is further away from ground than wiper 23, a voltage 180 degrees out of phase will appear at wiper 25, again varying in amplitude with the magnitude of displacement.

The voltage appearing at wiper 25 is amplified in known manner by discharge device 27 and applied to control electrodes 53 and 54 of discharge devices 55 and 56. As is well known to those skilled in the art, discharge devices 55 and 56 act as modulators for the current supplied to motor winding 67, the phase of the output voltage depending upon the phase of the signal supplied by discharge device 27. Rotor 74 rotates in either direction, depending upon the phase of the applied signal. The position of wiper 22 of calibrated standard potentiometer 16 is adjusted until it is precisely the same electrical distance from ground as wiper 23. Since the position of wiper 22 is accurately calibrated in percent of total travel, the position of wiper 23 may be read as a percent of total travel and recorded in a suitable manner. The percentages corresponding to a succession of positions of wiper 23 are similarly taken, resulting in a calibration chart of potentiometer 17.

While there has been described what is at present considered to be the preferred embodiment of this invention, it will be understood that various modifications may be made therein, and it is intended to cover in the appended claims all such modifications as fall within the true spirit and scope of this invention.

What I claim is:

1. In a calibrating device, a center-tapped transformer winding, a standard potentiometer having a movable wiper connected to one end of said winding, means for connecting a potentiometer to be calibrated having a wiper to the other end of said winding, a conductor connecting the center tap of said transformer to said potentiometers combining means connected to said wipers, and a phase responsive servo system connected to said combining means for adjusting the position of the wiper on said standard potentiometer.

2. In a calibrating device, a center-tapped transformer winding, a standard potentiometer having a movable wiper connected to one end of said winding, means for connecting a potentiometer to be calibrated, having a wiper, to the other end of said winding, a conductor connecting the center tap of said transformer to said potentiometers, combining means connected to said wipers, an amplifier responsive to said combining means, and a phase responsive servo system connected to said amplifier for adjusting the position of the wiper on said standard potentiometer.

References Cited in the file of this patent

UNITED STATES PATENTS 2,387,795     Isserstedt  --------------- Oct. 20, 1945